United States Patent [19]

Warren

[11] 3,972,440
[45] Aug. 3, 1976

[54] METER HOUSING
[75] Inventor: Donald K. Warren, Winchester, Va.
[73] Assignee: Phillips Petroleum Company, Bartlesville, Okla.
[22] Filed: Oct. 20, 1975
[21] Appl. No.: 624,091

[52] U.S. Cl. .................................. 220/18; 220/71; 52/742
[51] Int. Cl.² .................... B65D 25/24; B65D 7/42; E04B 1/00
[58] Field of Search ............. 220/18, 256, 90.4, 71, 220/85 R, 72, 73, 74; 52/742

[56] References Cited
UNITED STATES PATENTS

| 989,695 | 4/1911 | Clark | 220/18 X |
|---|---|---|---|
| 2,486,932 | 11/1949 | Elliot | 220/18 X |
| 2,563,470 | 8/1951 | Kane | 280/5 |
| 3,392,867 | 7/1968 | Morris | 220/18 |
| 3,837,521 | 9/1974 | Huston et al. | 220/18 X |

Primary Examiner—William Price
Assistant Examiner—Steven M. Pollard

[57] ABSTRACT

A housing for containing a meter such as a water meter or the like, with the housing being adapted to be buried in the ground. The housing is comprised of a generally cylindrical member having a hollow interior with a cover mounted on the upper end thereof. A lid is provided for closing an opening through the cover. A brace which is sized and shaped to fit within the cylindrical member is removably retained in the interior thereof. The brace can remain within the housing or can be removed therefrom and provides support for the cylindrical member during installation of same in the ground when the hole is being filled with dirt or other filler material. The brace, if desired, is removed through an opening through the cover which is smaller than the open end of the cylindrical member.

7 Claims, 3 Drawing Figures

METER HOUSING

Meter housings are well known in the art but have been inadequate in certain respects, particularly in providing a housing which has sufficient strength for installation operations which is generally over-adequate strengthwise for use after installation. In the past it has been the custom to design housings to withstand treatment during installation whereby same would be overdesigned for use after installation. The present apparatus contemplates the use of a housing which is adequate for after installation use and by use of a removable brace provides adequate support and rigidity during installation. This then, in effect, allows the construction of a less expensive but still adequate meter housing.

The principal objects and advantages of the present invention are: to provide a meter housing which provides adequate rigidity and support both during installation and after installation use; to provide such a housing with a removable brace which provides increased rigidity and support during installation; to provide such a housing which is more economical to manufacture while still maintaning adequate structural characteristics; to provide such a housing which can be easily manufactured from existing materials; and, to provide such a housing which is well adapted for its intended use.

Other objects and advantages of the present invention will become apparent from the following description taken in connection with the accompanying drawings wherein are set forth by way of illustration and example certain embodiments of the present invention.

Figure 1:
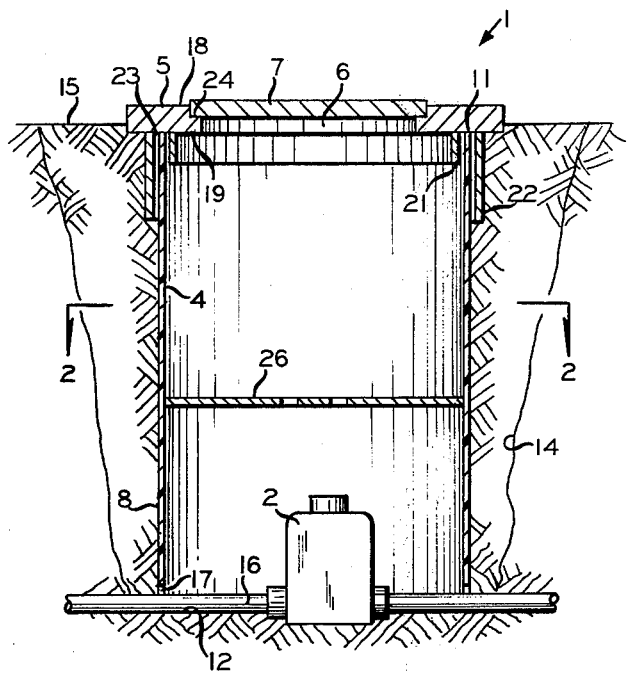
FIG. 1 is a sectional view of a meter housing shown installed for use in the ground.
Figure 2:
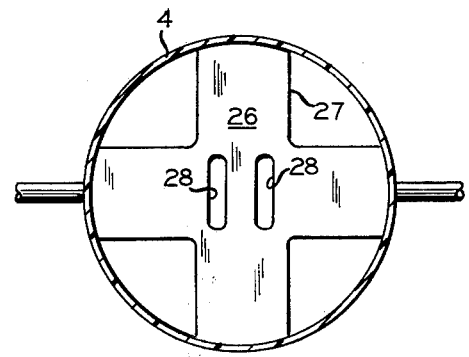
FIG. 2 is a section view of the housing taken along the line 2—2, FIG. 1.
Figure 3:
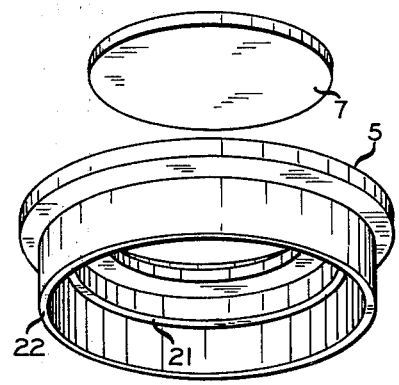
FIG. 3 is an exploded perspective view of the meter housing.
Figure 3:
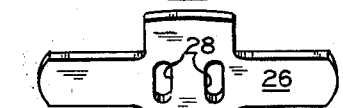
Figure 3:
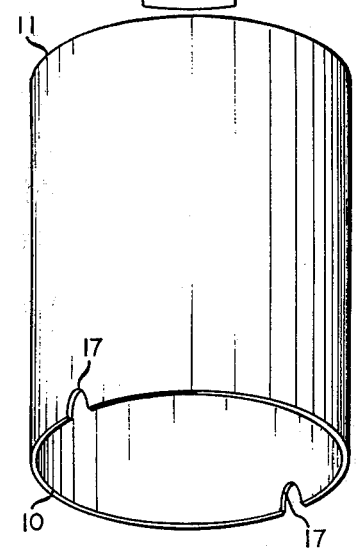

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis of the claims and as a representative basis for teaching one skilled in the art to variously employ the present invention in virtually any appropriate and detailed structure.

The reference numeral 1 designates generally a meter housing which is adapted to contain a meter 2 which preferably is positioned below the ground level wherein the meter 2 is typically a water meter, gas meter or the like. The housing 1 is comprised of a chamber forming housing member 4 which has one end thereof partially closed by a cover 5 which in turn preferably has a through access opening 6 which is selectively closed by a lid 7.

Any shape of housing member 4 can be provided and, as shown, same is generally cylindrically shaped and is formed by a side wall 8 which has opposite ends 10 and 11. The end 10, as shown, is adapted to rest on the bottom surface 12 of a hole 14 in which the housing member 4 is received. The upper end 11 is preferably approximately flush with the surface of the ground 15. As shown, the housing member 4 has both ends thereof open whereby same can be formed from a tube such as an extruded plastic pipe which is cut to a predetermined length as required by the particular depth of installation of the meter 2. As shown, the meter 2 rests on the bottom 12 and is connected in a conduit or line 16. Although the conduit 16 can be positioned under the housing member 4, as shown, notches 17 are provided in the side wall 8 adjacent the lower end 10 to provide access for the conduit to extend into the interior of the housing member 4.

The cover 5 can be of any suitable construction having the opening 6 therethrough communicating with the interior of the housing member 4 to provide access to the meter 2 when desired such as for reading or service. As shown, the cover 5 is a generally flat disc having opposite surfaces 18 and 19 with the upper facing surface 18 preferably being substantially flush with the ground level. Means are provided to mount the cover 5 on the housing member 4 and, as shown, a pair spaced apart flanges 21 and 22 are provided. The flanges 21 and 22 extend from the surface 19 and form a groove 23 therebetween. Preferably, the flanges 21 and 22 are rings and receive an upper end portion of the side wall 8 therebetween for mounting of the cover 5 on the housing member 4. Preferably, the flange 22 has a length longer than the flange 21 as, for example, the flange 22 would have a length of approximately 4 inches and the flange 21 would have a length of approximately 1 inch. Such a construction provides rigidity for the upper end of the housing member 4 after installation. The cover 5 is made of a strong and rigid material such as cast iron which provides for easy and inexpensive manufacture. The opening 6 is of a size smaller than te open end 11 of the housing member 4.

The lid 7 can be of any suitable construction as is known in the art and is mounted on the cover 5 in any suitable manner and, as shown, is received within a recess 24 which would prevent lateral movement of the lid 7. Means can also be provided to securely clamp the lid 7 to the cover 5 as is known in the art.

A brace 26 is provided and is sized and shaped to fit within the interior of the housing member 4 to provide support and rigidity for same to prevent the housing member 4 from collapsing inwardly. The support is provided by having the brace 26 contact the side wall 8 at a plurality of positions therearound providing multiaxis support preferably in one plane (the axes may or may not be normal to one another and can be any number of two or more). The brace 26 has at least one notch 27 extending inwardly or toward the center thereof from the outer periphery of the brace whereby a dimension is provided across the brace, between an edge defining the notch and an edge of the brace opposite the notch edge, which is smaller than the largest dimension of the opening 6. As shown, a plurality of the notches 27 are provided and are spaced about the periphery of the brace 26 with four notches being shown providing four points of contact approximately 90° apart. Preferably, the housing member 4 is substantially round as is the brace 26, exclusive of the notches 27. The brace 26 is a substantially flat disc type member which is rigid and can be made of a material such as plywood, polyethylene, aluminum or the like. In a position for installation of the housing member 4, the brace extends across the housing member 4 and is generally perpendicular or normal to the side wall 8 providing support and rigidity to prevent collapsing of the housing member 4 during filling of the hole 14. The brace 26 is releasably or removably retained within the housing member 4 and, as shown, same is in frictional engagement with the sidewall 8 with the frictional engagement retaining same in position for installation of the housing 1, as shown in FIG. 1. Turning of the brace 26, as for example, 90°, about a horizontal axis of rotation, as seen in FIG. 1, the brace 26 has a dimension across the notches which is less than the inside dimension of the housing member 4 whereby same is not in frictional engagement with the side wall 8 to facilitate movement of the brace 26 within the housing member 4. Because the notches 27 provide a dimension less than the largest dimension of the opening 6, the brace 26 can be easily removed through the opening 6 after installation of the housing member 4 which would have the cover 5 mounted thereon. A pair of spaced apart through apertures 28 can also be provided through the brace 26 to provide convenient handholds to facilitate operator handling of the brace 26.

The brace can be positioned above the meter as seen in FIG. 1 for a low mount meter which is the preferred installation or in the event that a high mount meter is used, then the brace 26 can be mounted below the meter and made a part of the installation of the housing 1 and remain therein. However, the preferred embodiment of the present invention is to have the brace 26 positioned above the meter 2 so that same can be removed for use in installations of other meter housings 1.

For installation a hole is first dug in the ground and a meter is positioned therein. Then, the housing member 4 would be positioned within the hole 14 with the bottom end 10 resting on the ground 12. Preferably, the brace 26 would then be inserted into the housing member 4 and turned so as to be generally normal to the side wall 8 to provide rigidity thereto. The cover 5 is then mounted on the end 11 of the housing member 4 and, optionally, the lid 7 can then be installed to close the opening 6. Fill material such as dirt or the like is then placed into the space between the housing member 4 and the surface defining the hole 14 to fill same around the housing member 4. The brace 26 provides extra support during the filling operation to prevent the housing member 4 from collapsing. After filling of the hole, the brace 26 can then be removed through the opening 6 as described above, after which the lid 7 can be placed on the cover 5 to close the opening 6. After removal, the brace 26 is available for use in other installations of meter housings. The fill provides a substantially uniform load on the exterior of the housing member 4 and, as such, the housing member 4 is not as likely to collapse as it would have been during filling. The flanges 21 and 22 also provide support for the side wall 8 after the hole is filled. The housing member 4 has sufficient strength in a vertical direction, as seen in FIG. 1, to support a normal load which would be encountered by the meter housing 1. Such a construction permits the use of thin-wall polyethylene tubing as, for example, 0.165 inches thick, which could not otherwise be used because of the load encountered during filling of the hole.

It is to be understood that while I have illustrated and described certain forms of my invention, it is not to be limited to the specific form or arrangement of parts herein described and shown.

What is claimed and desired to be secured by Letters Patent is:

1. A housing adapted to be used to house a meter or the like underground, said housing including:

a. a member having opposite ends and a hollow interior defined at least partially by a side wall, said member having a first opening in one of said ends;

b. a cover engaging portions of said member adjacent said one end and is at least partially supported by said member, said cover overlies at least a portion of said first opening partially closing same and has a second opening communicating with said interior, said second opening has a size smaller than said first opening; and c. a brace sized and shaped to fit within the interior of member and is removably retained therein, said brace is generally normal to said side wall and has at least one notch extending partially inwardly from the periphery of the brace and is defined by an edge, said edge is spaced from the opposite side of the brace a distance less than the distance across said second opening.

2. The housing as set forth in claim 1 including:

a. a lid removably engaging portions of said cover and operable for selectively closing said opening.

3. The housing as set forth in claim 2 wherein:

a. said member is generally cylindrically shaped.

4. The housing as set forth in claim 3 wherein:

a. said brace has a plurality of said notches spaced around the periphery thereof and is releasably retained in said member by frictional engagement with said sidewall.

5. The housing as set forth in claim 3 wherein:

a. said cover has a pair of spaced apart flanges extending from a surface thereof and which form a groove therebetween, said groove has an end portion of said member therein with one flange being on one side of said wall and the other flange being on the other side of said wall.

6. A housing adapted to be used to house a meter or the like underground, said housing including:

a. a generally cylindrical member having a side wall and first and second ends with said second end having a first opening;

b. a cover having a pair of flanges extending from a surface thereof with said flanges being spaced apart defining a groove therebetween, said cover is in engagement with said cylindrical member and has an end portion of same received within said groove, said cover overlies a portion of said second end partially closing said first opening and has a through second opening sized smaller than said first opening;

c. a brace sized and shaped to fit within the cylindrical member and is removably retained therein normally in a position generally normal to said side wall, said brace has at least one notch which extends inwardly from the periphery of the brace whereby one width dimension of the brace is smaller than the largest dimension of the second opening whereby said brace is removable through said second opening; and d. a lid removably mounted on said cover for selectively closing said second opening.

7. A method of installing an underground meter housing comprising:

a. positioning a housing member in a hole in the ground with one end engaging the ground;

b. inserting a removable brace in said housing member and positioning same for supporting a side wall of the housing member;

c. mounting a cover on said housing member;

d. filling said hole around said housing member; and e. removing said brace through an opening in said cover.

* * * * *